United States Patent
Kim et al.

(10) Patent No.: US 8,088,707 B2
(45) Date of Patent: Jan. 3, 2012

(54) SUPPORTED CATALYST WITH SOLID SPHERE STRUCTURE, METHOD FOR PREPARING THE SAME AND CARBON NANOTUBES PREPARED USING THE SAME

(75) Inventors: Byeong Yeol Kim, Uiwang-si (KR); Yun Tack Lee, Uiwang-si (KR); Seung Yong Bae, Uiwang-si (KR); Young Sil Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/640,747

(22) Filed: Dec. 17, 2009

(65) Prior Publication Data

US 2010/0158788 A1    Jun. 24, 2010

(30) Foreign Application Priority Data

Dec. 22, 2008   (KR) ................................ 2008-131247
Dec. 16, 2009   (KR) ................................ 2009-125368

(51) Int. Cl.
 *B01J 23/00*   (2006.01)
 *B01J 21/00*   (2006.01)
 *B01J 20/00*   (2006.01)

(52) U.S. Cl. ........ 502/326; 502/252; 502/259; 502/260; 502/263; 502/306; 502/312; 502/313; 502/314; 502/315; 502/316; 502/317; 502/321; 502/323; 502/325; 502/327; 502/328; 502/335; 502/336; 502/337; 502/338; 502/340; 502/341; 502/353; 502/355; 502/407; 502/415; 502/439; 502/527.12; 502/527.13; 502/527.19; 977/742; 977/843

(58) Field of Classification Search .................. 502/252, 502/258–260, 263, 306, 312–317, 321, 323, 502/325–328, 335–338, 340, 341, 353, 355, 502/407, 415, 439, 527.12, 527.13, 527.19; 977/742, 843

See application file for complete search history.

(56) References Cited

U.S. PATENT DOCUMENTS

| | | | | |
|---|---|---|---|---|
| 3,907,714 A | * | 9/1975 | Compton et al. | 502/304 |
| 4,039,480 A | * | 8/1977 | Watson et al. | 502/9 |
| 4,058,485 A | * | 11/1977 | Cheung | 502/331 |
| 4,193,793 A | * | 3/1980 | Cheung | 75/235 |
| 4,257,874 A | * | 3/1981 | Bergna | 208/111.15 |
| 4,259,211 A | * | 3/1981 | Krabetz et al. | 502/178 |
| 4,272,409 A | * | 6/1981 | Bergna | 502/8 |
| 4,547,468 A | * | 10/1985 | Jones et al. | 501/33 |
| 4,802,974 A | * | 2/1989 | Kukes et al. | 208/217 |
| 4,835,131 A | * | 5/1989 | DeJong | 502/255 |
| 5,225,389 A | * | 7/1993 | Caillod et al. | 502/205 |
| 5,935,889 A | * | 8/1999 | Murrell et al. | 502/9 |
| 6,268,522 B1 | * | 7/2001 | Hagemeyer et al. | 560/245 |
| 6,656,349 B1 | * | 12/2003 | Fujita et al. | 208/216 PP |
| 7,361,626 B2 | * | 4/2008 | Baijense et al. | 502/329 |
| 7,534,737 B2 | * | 5/2009 | Gajda | 502/60 |
| 7,629,289 B2 | * | 12/2009 | Bauer et al. | 502/314 |

(Continued)

*Primary Examiner* — Cam N. Nguyen
(74) *Attorney, Agent, or Firm* — Summa, Additon & Ashe, P.A.

(57) ABSTRACT

A supported catalyst with a solid sphere structure of the present invention includes an oxide supporting body and a metal such as Ni, Co, Fe, or a combination thereof distributed on the surface and inside of the supporting body. The supported catalyst with a solid sphere structure can maintain a spherical shape during heat treatment and can be used with a floating bed reactor due to the solid sphere structure thereof.

12 Claims, 2 Drawing Sheets

(a)

(b)

U.S. PATENT DOCUMENTS

| | | | |
|---|---|---|---|
| 7,723,263 B2 * | 5/2010 | Koike et al. | 502/439 |
| 7,737,079 B2 * | 6/2010 | Ryu | 502/335 |
| 7,745,372 B2 * | 6/2010 | Li et al. | 502/314 |
| 7,776,205 B2 * | 8/2010 | Soled et al. | 208/5 |
| 7,780,845 B2 * | 8/2010 | Soled et al. | 208/148 |
| 7,803,972 B2 * | 9/2010 | Guckel et al. | 568/471 |
| 7,902,104 B2 * | 3/2011 | Kalck et al. | 502/66 |
| 7,923,406 B2 * | 4/2011 | Potapova et al. | 502/325 |
| 2003/0036476 A1 * | 2/2003 | Arnold et al. | 502/325 |
| 2003/0162848 A1 * | 8/2003 | Gimpel et al. | 518/716 |
| 2003/0181535 A1 * | 9/2003 | Van Hardeveld et al. | 518/715 |
| 2009/0209415 A1 * | 8/2009 | Kayama et al. | 502/303 |

* cited by examiner

[Figure 1]
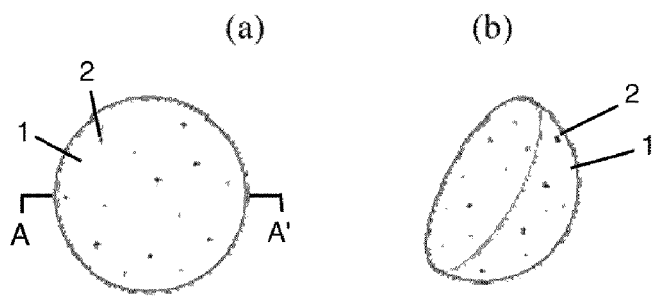
[Figure 2]
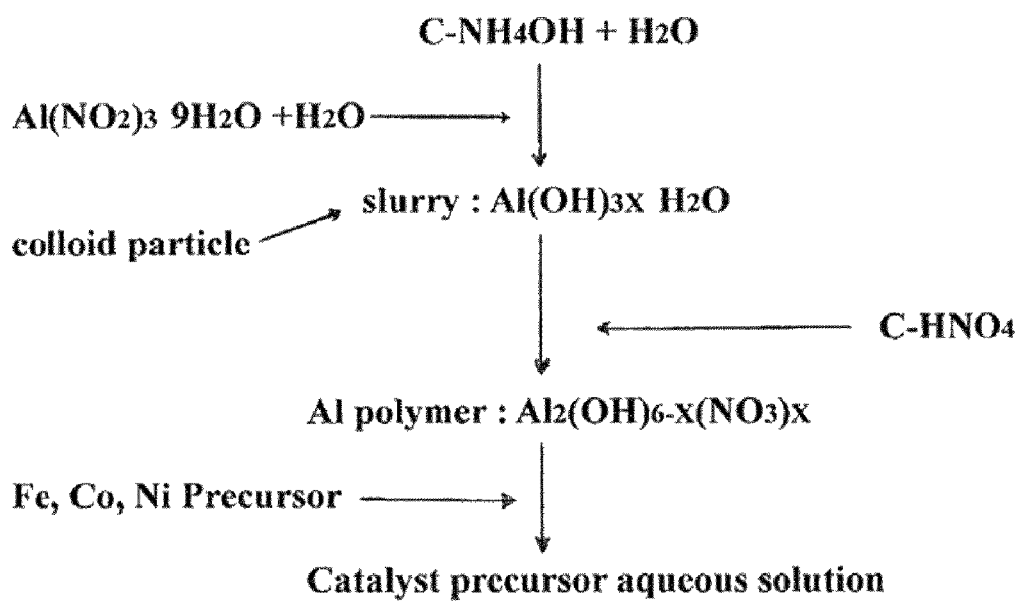

[Figure 3]
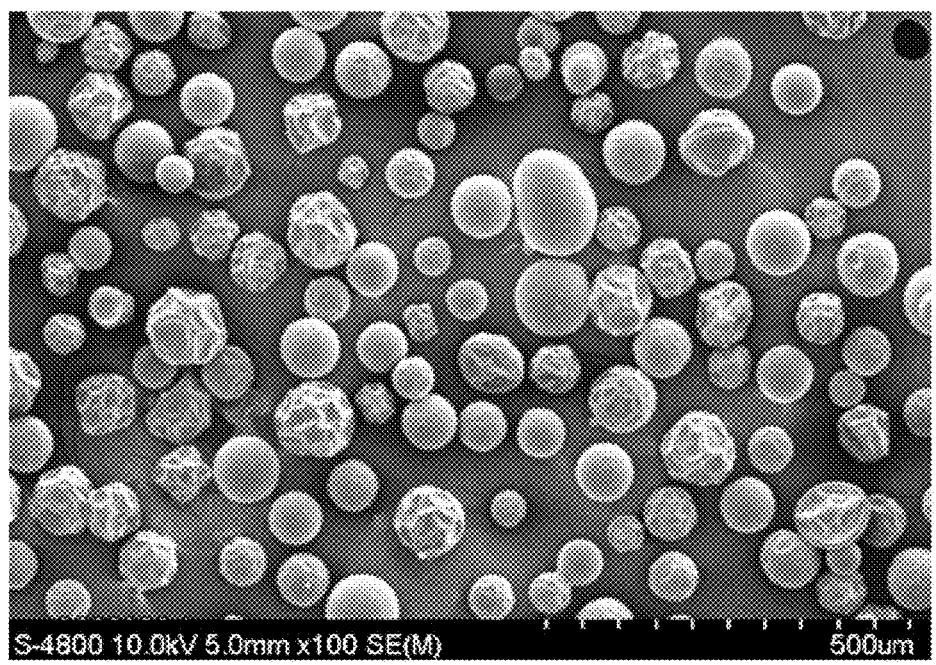
[Figure 4]
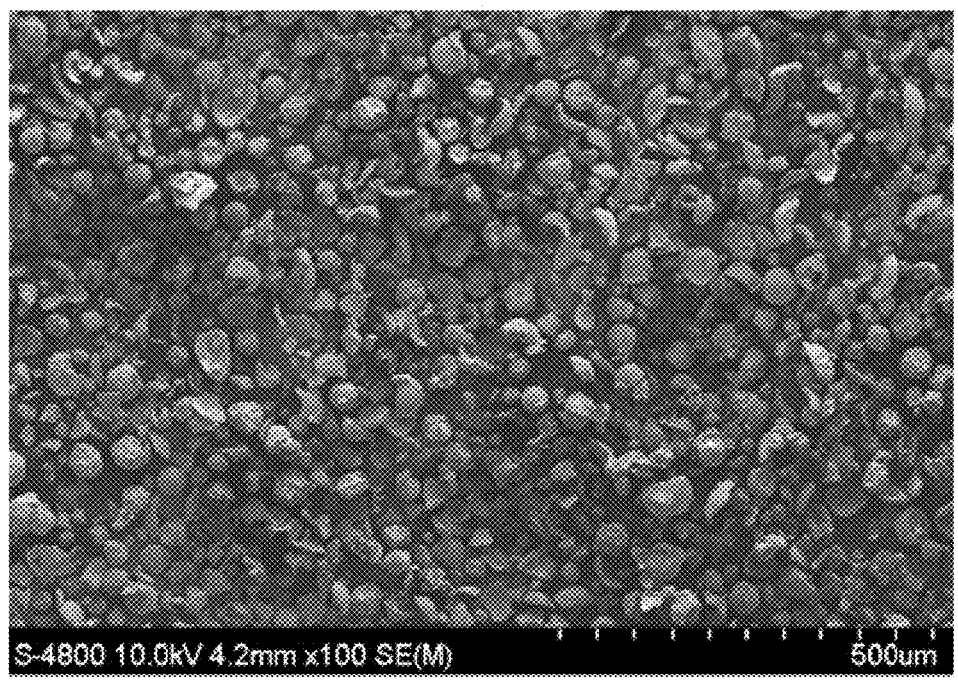

SUPPORTED CATALYST WITH SOLID SPHERE STRUCTURE, METHOD FOR PREPARING THE SAME AND CARBON NANOTUBES PREPARED USING THE SAME

CROSS REFERENCE TO RELATED APPLICATIONS

This application claims priority from Korean Patent Application No. 2008-131247 filed on Dec. 22, 2008 in the Korean Intellectual Property Office, and Korean Patent Application No. 2009-125368, filed Dec. 16, 2009 in the Korean Intellectual Property Office, the disclosure of which is incorporated herein by reference in its entirety.

FIELD OF THE INVENTION

The present invention relates to a supported catalyst with a solid sphere structure, a method for preparing the same and a carbon nanotube prepared using the same.

BACKGROUND OF THE INVENTION

Carbon nanotubes having a cylinder form in which graphite is rolled to form the faces thereof have good electrical characteristics and accordingly are widely used in devices such as electronic emitting devices, electronic device elements, sensors, and the like, and are also used in high strength composite materials due to their high physical properties. Carbon nanotubes can be classified as single-walled carbon nanotubes, double-walled carbon nanotubes and multi-walled carbon nanotubes according to the number of rolled surfaces of the cylinder form, and can have different properties according to the number of such walls.

Recently, there has been much research on methods for synthesizing carbon nanotubes, which can produce large quantities of carbon nanotubes at one time, as well as catalytic synthesis methods for carbon nanotubes with high yields and purity. Among the various synthetic methods, thermal chemical vapor deposition is advantageous with regard to large-scale production and simple equipment needs. Thermal chemical vapor deposition is classified as a fixed bed reactor or a fluidized bed reactor method. The fixed bed reactor method is not largely influenced by shapes or sizes of metal supporting bodies, but cannot produce large quantities of carbon nanotubes at one time due to space limitations inside the reactor. Fluidized bed reactors can synthesize large quantities of carbon nanotubes at one time more easily than fixed bed reactors because the reactor stands up vertically.

Because a fluidized bed reactor can continuously produce large quantities of carbon nanotubes compared with a fixed bed reactor, there are many studies of the fluidized bed reactor. However, the fluidized bed reactor should evenly (uniformly) maintain the shapes and sizes of catalyst particles and float the catalyst particles evenly (uniformly). Accordingly, there is need to develop a synthetic method for producing a catalyst having a metal supporting body with an even (uniform) shape and size, which can be important when using the same in a fluidized bed reactor. Consequently, control of catalyst particle size, density, and the like are considered important factors in the fluidized bed reaction process.

In the fluidized bed reaction process used in large-scale production systems, the catalyst is also used in large quantities. A spherical shaped catalyst particle can be advantageous in the fluidized bed reaction process and thus is considered as an important factor.

Generally, spray-drying methods are largely used to make particles with a spherical shape. It is more difficult, however, to control the shapes of catalyst particles by the spray-drying method than in earlier small-scale production systems. In other words, the flux of flowing gas and the volume of the reactor are increased when using the spray-drying method for large-scale production. Further, the faster the drying speed of a precursor solution including the catalyst, the more likely the catalyst will have a hollow shape. A hollow shaped-catalyst, however, can be easily broken during the burning process used in catalyst synthesis so that irregular shaped-catalysts can be produced. If irregular shaped catalyst is used in a fluidized bed reactor, this can change floating reaction conditions and adversely affect final carbon nanotube quality and yields.

SUMMARY OF THE INVENTION

The present inventors have developed a supported catalyst with a solid sphere structure which can maintain the spherical shape thereof during a synthetic process and a method for preparing the same. The method of preparing the supported catalyst includes adding a nonmetal alkali solution which can react with a supporting body precursor during a process of preparing a catalyst precursor solution. The supported catalyst of the present invention can have excellent productivity and can be useful for a floating bed reactor due to the solid sphere structure thereof. Accordingly, the supported catalyst of the present invention can provide carbon nanotubes with high selectivity and purity, and can thereby save time and reduce costs.

An aspect of the present invention provides a supported catalyst with a solid sphere structure. The supported catalyst has an oxide supporting body comprising at least one metal comprising Ni, Co, Fe, or a combination thereof, has a solid sphere structure in which the inside of the sphere is filled, and has metal distributed on the surface and the inside of the supporting body. The oxide supporting body may include aluminum oxide, magnesium oxide, silica (silicon dioxide), or a combination thereof.

The solid sphere structure in which the inside is filled can have an oval shape as well as a spherical shape. In an exemplary embodiment, the solid sphere structure may have a substantially spherical shape of about 20 to about 100 μm average diameter or an oval shape of about 0 to about 0.2 flattening rate.

In an exemplary embodiment, the supported catalyst may have a bulk density of about 0.3 to about 0.6 g/ml.

In an exemplary embodiment, the supported catalyst may have a composition as follows:

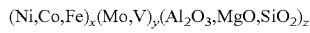

$$(Ni,Co,Fe)_x(Mo,V)_y(Al_2O_3,MgO,SiO_2)_z$$

wherein x, y and z are each a mole ratio, and $1 \leq x \leq 10$, $0 \leq y \leq 5$, and $2 \leq z \leq 15$.

Another aspect of the present invention provides a method for preparing a supported catalyst with a solid sphere structure. The method comprises the steps of: preparing a slurry by mixing a supporting body precursor and a nonmetal alkali solution; preparing a catalyst precursor aqueous solution by adding metal hydrate to the slurry; and spray-drying the catalyst precursor aqueous solution.

In an exemplary embodiment, the nonmetal alkali solution may be ammonia water (also known as aqueous ammonia or ammonium hydroxide).

In an exemplary embodiment, the metal hydrate may be added after the slurry is neutralized by adding acid. The acid may be nitric acid, hydrochloric acid, sulphuric acid, acetic acid, phosphoric acid, or a combination thereof.

In an exemplary embodiment, the preparing method may further comprise a burning step after the spray-drying step.

The metal hydrate may comprise iron (III) nitrate hydrate, nickel nitrate hydrate, cobalt nitrate hydrate, or a combination thereof.

The supporting body precursor can be an oxide supporting body precursor, which may comprise aluminum nitrate hydrate, magnesium nitrate hydrate, silica hydrate, or a combination thereof.

In an exemplary embodiment, the supporting body precursor and the nonmetal alkali solution can be mixed in a mole ratio of about 1:about 0.5 to about 3:about 1.

In an exemplary embodiment, the catalyst precursor aqueous solution can further comprise molybdenum (Mo) based activator, vanadium (V) based activator, or a combination thereof and may be spray-dried.

The spray-drying may be performed at a temperature of about 100 to about 250° C. a disc rotation ratio of about 5,000 to about 20,000 rpm and an injection volume of solution of about 15 to about 100 mL/min.

The burning may be performed at temperature of about 400 to about 1500° C.

The supported catalyst prepared in accordance with the method of the invention can have a solid sphere structure in which the inside is filled. As used herein, reference to the solid sphere structure includes both a substantially spherical shape and an oval shape.

Another aspect of the present invention provides a supporting body precursor with a solid sphere structure. The supporting body precursor may comprise ammonium salt and may have a mole ratio as follow:

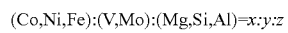
(Co,Ni,Fe):(V,Mo):(Mg,Si,Al)=x:y:z wherein 1≦x≦10, 0≦y≦5, and 2≦z≦30.

Another aspect of the present invention provides a carbon nanotube prepared using the supported catalyst. The supported catalyst of the present invention may be used to synthesize a carbon nanowire as well as a carbon nanotube. In addition, the supported catalyst of the present invention may be used to synthesize a nanotube or a nanowire which includes atoms other than or in addition to carbon atoms by injecting and reacting gases other than or in addition to hydrocarbon gas in the presence of the supported catalyst. The carbon nanotube may be synthesized in a fixed bed reactor or a fluidized bed reactor, for example in a fluidized bed reactor. In an exemplary embodiment, the carbon nanotube may be synthesized at temperature of about 600 to about 1100° C. by injecting hydrocarbon gas in the presence of the supported catalyst.

BRIEF DESCRIPTION OF THE DRAWINGS

FIG. 1 (a) is a schematic view of a supported catalyst with a solid sphere structure of the present invention and FIG. 1 (b) is a schematic view of a sectional part of the sphere of FIG. 1 (a) cut along line A to A'.

FIG. 2 is a schematic diagram of a process for preparing the catalyst precursor solution of Example 1.

FIG. 3 is a transmission electron microscope (TEM) image of the supported catalyst of Example 2.

FIG. 4 is a transmission electron microscope (TEM) image of the supported catalyst of Comparative Example 1.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Supported Catalyst

The present invention provides a supported catalyst with a solid sphere structure. FIG. 1 (a) is a schematic view of the supported catalyst with a solid sphere structure of the present invention and FIG. 1 (b) is a schematic view of a sectional part of the sphere of FIG. 1 (a) cut along line A to A'.

The supported catalyst of the present invention includes metal(s) (2) carried by the supporting body (1) and has a substantially spherical shape. As used herein, reference to the spherical shape of the supported catalyst includes an oval shape as well as a substantially spherical shape as observed by a transmission electron microscope (TEM) of 500 magnification. In exemplary embodiments, an oval form may have about 0 to about 0.2 flattening rate. The supporting body (1) may form pore(s) on its surface. Projections may also be formed on the surface of the supported catalyst of the present invention. Accordingly, the skilled artisan will appreciate that some irregularities in the catalyst shape and/or catalyst surface and/or catalyst interior can be present without falling outside of the scope of the claimed invention. For example, reference to a spherical or oval shape does not limit the invention to a precise or exact spherical or oval shape and the skilled artisan will appreciate that the invention can include some variances so long as the support catalyst has a generally spherical or oval shape.

The supported catalyst with a sphere structure has a solid sphere structure in which the interior thereof is filled as illustrated in FIG. 1 (b). The solid sphere structure described hereinafter is the opposite concept to a hollow structure. The interior of the supporting body may also have pores. The skilled artisan will appreciate that the interior can include pores and still be a filled structure as used herein, so long as a substantial portion of the interior of the supported catalyst is filled (for example, at least half of the interior volume, or more, of the supported catalyst is filled). In addition, the supported catalyst of the present invention includes metals (2) which are distributed in the interior of the solid sphere as well as on the surface of the solid sphere. Also, the metals (2) can be distributed in the pores which can exist in the interior of the solid sphere.

The supported catalyst of the present invention can have a higher specific gravity and density than a supported catalyst with a hollow structure due to the solid sphere structure thereof. In an exemplary embodiment, the bulk density of the supported catalyst may be about 0.3 to about 0.6 (g/ml). The supported catalyst has a solid sphere structure in which the interior is filled but may have infinitesimal pores as mentioned above, and the pores can be classified as open pores and closed pores. The bulk density is defined as the mass of a particle divided by the total volume of a particle which comprises both open pores and closed pores.

The metal may be Ni, Co, Fe, an alloy thereof, or a combination thereof. The supporting body may be an oxide supporting body, for example, may include aluminum oxide, magnesium oxide, silica (silicon dioxide), or a combination thereof.

The supported catalyst of the present invention may have an average diameter of about 20 to about 100 μm, for example about 30 to about 95 μm, and as another example about 40 to about 90 μm. In an exemplary embodiment, the average diameter may be about 35 to about 50 μm. In another exemplary embodiment, the average diameter may be about 55 to about 80 μm, for example about 75 to about 100 μm.

In one exemplary embodiment of the present invention, the supported catalyst may have a composition as follows:

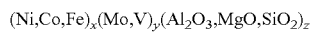
(Ni,Co,Fe)$_x$(Mo,V)$_y$(Al$_2$O$_3$,MgO,SiO$_2$)$_z$ wherein $1 \leq x \leq 10$, $0 \leq y \leq 5$, and $2 \leq z \leq 15$.

As used herein, the formula of the composition

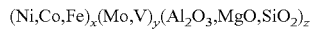
(Ni,Co,Fe)$_x$(Mo,V)$_y$(Al$_2$O$_3$,MgO,SiO$_2$)$_z$ will be understood to include (Ni or Co or Fe or a combination thereof)$_x$(Mo or V or a combination thereof)$_y$(Al$_2$O$_3$ or MgO or SiO$_2$ or a combination thereof)$_z$.

In another exemplary embodiment, the supported catalyst may have a composition as follows:

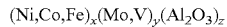
(Ni,Co,Fe)$_x$(Mo,V)$_y$(Al$_2$O$_3$)$_z$ wherein $1 \leq x \leq 10$, $0 \leq y \leq 5$, and $2 \leq z \leq 15$.

As used herein, the formula of the composition

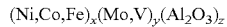
(Ni,Co,Fe)$_x$(Mo,V)$_y$(Al$_2$O$_3$)$_z$ will be understood to include (Ni or Co or Fe or a combination thereof)$_x$ (Mo or V or a combination thereof)$_y$(Al$_2$O$_3$)$_z$.

In another exemplary embodiment, the supported catalyst may have a mole ratio as follows:

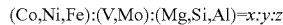
(Co,Ni,Fe):(V,Mo):(Mg,Si,Al)=$x$:$y$:$z$ wherein $1 \leq x \leq 10$, $0 \leq y \leq 5$, and $2 \leq z \leq 30$.

As used herein, the formula of the composition

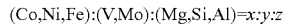
(Co,Ni,Fe):(V,Mo):(Mg,Si,Al)=$x$:$y$:$z$ will be understood to include (Co or Ni or Fe or a combination thereof):(V or Mo or a combination thereof): (Mg or Si or Al or a combination thereof).

Method for Preparing the Supported Catalyst

Another aspect of the present invention provides a method for preparing the supported catalyst. The preparing method comprises the steps of: preparing a slurry by mixing a supporting body precursor and a nonmetal alkali solution; preparing a catalyst precursor aqueous solution by adding metal hydrate to the slurry; and spray-drying the catalyst precursor aqueous solution.

The supporting body precursor may be an oxide such as but not limited to aluminum nitrate hydrate, magnesium nitrate hydrate, silica hydrate, the like, and combinations thereof. The supporting body precursor can be dissolved in water and can be mixed with a nonmetal alkali in the form of an aqueous solution. The supporting body precursor and the nonmetal alkali solution can be mixed in a mole ratio of 1:about 0.5 to about 3:about 1, for example about 1:about 1 to about 2:about 1.

The nonmetal alkali solution may be ammonia water. If the nonmetal alkali solution is not used, the solid sphere structure cannot be achieved.

If the supporting body precursor and the nonmetal alkali solution are mixed, a white slurry can be formed as a state of aluminum hydroxide hydrate, magnesium hydroxide hydrate, silica hydrate, or a combination thereof. The slurry may be alkaline, and may be neutralized by adding acid. The acid may be nitric acid, hydrochloric acid, sulphuric acid, acetic acid, phosphoric acid, or a combination thereof, for example nitric acid. If the acid is added, salt is formed. Then, the catalyst precursor solution is prepared by adding metal to the slurry.

In an exemplary embodiment, the metal may be a metal hydrate. Exemplary metal hydrates may include without limitation iron (III) nitrate hydrate, nickel nitrate hydrate, cobalt nitrate hydrate, and the like, and combinations thereof. In other exemplary embodiments, the metal may be used in the form of iron (III) nitrate nonahydrate, cobalt nitrate nonahydrate, or a combination thereof.

In other exemplary embodiments of the present invention, the catalyst precursor aqueous solution may further comprise molybdenum (Mo) based activator, vanadium (V) based activator, or a combination thereof, such as ammonium molybdate tetrahydrate, to prevent lumping among the metal catalyst during the burning process.

The catalyst precursor aqueous solution can be sprayed as drops with a sprayer. The diameter of the drops may be about 0.1 to about 100 μm, for example about 10 to about 100 μm. If the diameter of the drops is larger than about 10 μm, loss of particles can be reduced even under floating reaction conditions in which the speed of a running fluid is low. However if the diameter of the drops is larger than about 100 μm, the particles may not be able to float because the particle size thereof may be too big. The sprayer may be an ultrasonic sprayer, air nozzle sprayer, electrostatic sprayer, ultrasonic nozzle sprayer, or filter expansion aerosol generator (FEAG). The ultrasonic sprayer, electrostatic sprayer, and filter expansion aerosol generator (FEAG) are able to synthesize submicron size minute metal powders in high concentrations, while the air nozzle sprayer and the ultrasonic nozzle sprayer are able to synthesize sub-micron size minute metal powders in large quantities.

In exemplary embodiments, spray-drying may be performed at a temperature of about 110 to about 250° C., for example about 120 to about 240° C. The spray-drying may be performed by nozzle or rotating disc which rotates to form and sprinkle the drops. The size and the distribution of the drops can be regulated according to the disc rotation velocity, the injection volume and the density of the sprayed solution. In one exemplary embodiment of the present invention, the disc rotation velocity may be about 5,000 to about 20,000 rpm, and the injection volume of the sprayed solution may be about 15 to about 100 mL/min. In another exemplary embodiment, the disc rotation velocity may be about 10,000 to about 18,000 rpm, for example about 12,000 to about 19,000, and as another example about 5,000 to about 9,000, and the injection volume of the sprayed solution may be about 15 to about 60 mL/min, for example about 50 to about 75 mL/min, and as another example about 80 to about 100 mL/min.

The catalyst powder synthesized through the spray-drying can be heat-treated by a burning process. The catalyst powder becomes crystallized to a metal catalyst through the burning process. The diameter and the property of a supported catalyst are determined according to the burning temperature and time. In exemplary embodiments, the burning may be performed at about 400 to about 1500° C., for example about 450 to about 900° C., and as another example about 500 to about 800° C. The burning may be performed during about 15 minutes to about 3 hours, for example about 30 minutes to about 1 hour. Generally, a particle having a spherical shape synthesized by spray-drying is easily broken during the burning process. However the particle of the present invention can maintain its spherical shape during the burning process and can have a solid sphere structure by adding a nonmetal alkali solution which can react with a supporting body precursor. The final product contains minimal (i.e., an amount that does not interfere with downstream uses of the supported catalyst) or no nonmetal alkali solution or acid due to the burning process. The supported catalyst synthesized by the present invention can have a bulk density of about 0.3 to about 0.6 g/mL, and can have a substantially spherical shape in which the interior thereof is filled (or solid).

Carbon Nanotubes

Another aspect of the present invention provides a carbon nanotube produced using the supported catalyst. The supported catalyst of the present invention may be used to synthesize a carbon nanowire as well as a carbon nanotube. In addition, the supported catalyst of the present invention may be used to synthesize a nanotube or a nanowire which has atoms other than or in addition to carbon atoms by injecting and reacting gases other than or in addition to hydrocarbon gas in the presence of the supported catalyst. However, the supported catalyst of the present invention may be used to synthesize a carbon nanotube. The carbon nanotube may be synthesized in a fixed bed reactor or a fluidized bed reactor, for example in a fluidized bed reactor. A fluidized bed reactor can synthesize a large quantity of carbon nanotubes at once, and the supported catalyst of the present invention can be used with a fluidized bed reactor because the supported catalyst of the present invention has excellent floating ability due to its substantially even shape and diameter.

In exemplary embodiments, the carbon nanotube may be synthesized at a temperature of about 600 to about 1100° C., for example about 650 to about 950° C. by injecting hydrocarbon gas in the presence of the supported catalyst. In one exemplary embodiment, the carbon nanotube may be synthesized at a temperature of about 670 to about 800° C. In other exemplary embodiments, the carbon nanotube may be synthesized at a temperature of about 800 to about 990° C. In other exemplary embodiments, the carbon nanotube may be synthesized at a temperature of about 980 to about 1100° C. The hydrocarbon gas may comprise without limitation methane, ethylene, acetylene, LPG and the like, and combinations thereof. The hydrocarbon gas may be injected during about 15 minutes to about 2 hours, for example about 30 minutes to about 30 minutes.

The supported catalyst of the present invention has metal catalyst inside as well as on the surface thereof so that it can synthesize carbon nanotube with much higher yields than a hollow form supported catalyst. In addition, the supported catalyst of the present invention is especially apt for use with a fluidized bed reactor because the supported catalyst of the present invention is not easily broken during the synthesis process due to the solid sphere structure thereof.

The present invention will be well understood by the following examples. The following examples of the present invention are only for illustrative purposes and are not construed as being limited to the scope of the present invention defined by the appended claims.

EXAMPLES

Example 1

The Preparation of a Supported Catalyst

A supporting body precursor is prepared as an aqueous solution by dissolving about 7.5 mole ratio of aluminum nitrate hydrate $(Al(NO_3)_3 \cdot 9H_2O)$ to about 150 ml of water, then 7.5 mole ratio of ammonia water is mixed slowly with the aqueous solution during 3 minutes to synthesize a white slurry of $(Al_2(OH)_{3-x}H_2O)$. About 7.5 mole ratio of nitric acid is added to the white slurry and precipitates out an Al polymer $(Al_2(OH)_{6-x}(NO_3)_x)$, then a catalyst precursor aqueous solution is prepared by mixing the Al polymer $(Al_2(OH)_{6-x}(NO_3)_x)$ and a separately prepared metal hydrate aqueous solution, which is prepared by dissolving 2.0 mole ratio of iron (III) nitrate hydrate $(Fe(NO_3)_3 \cdot 9H_2O)$ and 2.0 mole ratio of cobalt nitrate hydrate $(Co(NO_3)_2 \cdot 6H_2O)$ to 20 ml of water. The process of preparing the catalyst precursor aqueous solution of Example 1 is represented in FIG. 2. A supported catalyst having solid sphere structure is prepared by spray-drying the catalyst precursor aqueous solution at about 140° C. using vane-type atomizer in which the dryer part has a diameter of about 900 mm.

The Preparation of a Carbon Nanotube

A carbon nanotube is prepared as follows by normal pressure thermal chemical vapor deposition. First, about 0.1 g of the metal nano catalyst synthesized in powder form is evenly placed on a ceramic boat, and the ceramic boat is fixed in a reactor. After that, the reactor is closed to be isolated from contact with the outside and heated to a reaction temperature of about 800° C. at a rate of 30° C./minute. During heating, inert gas such as nitrogen or argon is injected in an amount of about 500 sccm (standard cubic centimeter per minute) to remove remaining oxygen and the like in the reactor. When the temperature reaches at the reaction temperature, the injection of inert gas is stopped and synthesis is started by injecting hydrocarbon gas. The hydrocarbon gas is supplied during about 1 hour.

Example 2

The Preparation of a Supported Catalyst

The preparation process is carried out in the same manner as Preparation Example 1 except that a supporting body precursor is prepared as an aqueous solution by dissolving about 5.0 mole ratio of aluminum nitrate hydrate $(Al(NO_3)_3 \cdot 9H_2O)$ to about 140 ml of water. A supported catalyst with a solid sphere structure is synthesized by heat-treating the synthesized catalyst particle at about 550° C. and normal pressure, during about 35 minutes. A Scanning Electron Microscopic (SEM) image of the final supported catalyst is represented in FIG. 3.

The Preparation of a Carbon Nanotube

The preparation process is carried out in the same manner as Preparation Example 1 except that about 0.1 g of the metal nano catalyst in powder form which is synthesized in Example 2 is used.

Comparative Example 1

The Preparation of a Supported Catalyst

An catalyst precursor aqueous solution is prepared by mixing an supporting body precursor aqueous solution which is prepared by dissolving about 5.0 mole ratio of aluminum nitrate hydrate $(Al(NO_3)_3 \cdot 9H_2O)$ to about 140 ml of water; and an metal hydrate aqueous solution which is prepared by dissolving 2.0 mole ratio of iron (III) nitrate hydrate $(Fe(NO_3)_3 \cdot 9H_2O)$ and 2.0 mole ratio of cobalt nitrate hydrate $(Co(NO_3)_2 \cdot 6H_2O)$ to 20 ml of water, then without an preparing process of $(Al_2(OH)_{3-x}H_2O)$, a catalyst with a hollow sphere structure, not a solid sphere structure, is synthesized using a spray-dryer. A Scanning Electron Microscopic (SEM) image of the final supported catalyst is represented in FIG. 4. The hollow sphere structure catalyst in which the inside is not filled cannot maintain its sphere structure during a heat treatment at about 200° C. to about 1,500° C. which is the final process in the catalyst synthesis. Accordingly uniform floating conditions cannot be obtained in the final fluidized bed reaction.

The Preparation of a Carbon Nanotube

The preparation process is carried out in the same manner as Preparation Example 1 except that about 0.1 g of the metal nano catalyst in powder form which is synthesized in the Comparative Example 1 is used.

TABLE 1

|  | Example 1 | Example 2 | Comparative Example 1 |
|---|---|---|---|
| Whether the sphere structure is maintained or not | Sphere structure is maintained | Sphere structure is maintained | Sphere structure is not maintained |
| Productivity of carbon nanotubes* (%) | 1450 | 1420 | 1150 |

*Productivity of carbon nanotubes = (weight of synthesized carbon nanotubes − catalyst weight)/catalyst weight × 100

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A supported catalyst with a solid sphere structure, comprising an oxide supporting body and a metal, wherein the metal comprises Ni, Co, Fe, an alloy, or a combination thereof distributed on the surface and the inside of the oxide supporting body.

2. The supported catalyst with a solid sphere structure as claimed in claim 1, wherein the oxide supporting body comprises aluminum oxide, magnesium oxide, silica (silicon dioxide), or a combination thereof.

3. The supported catalyst with a solid sphere structure as claimed in claim 1, wherein the supported catalyst is for the synthesis of carbon nanotubes.

4. The supported catalyst with a solid sphere structure as claimed in claim 1, wherein the supported catalyst has a composition as follows:

$$(Ni,Co,Fe)_x(Mo,V)_y(Al_2O_3,MgO,SiO_2)_z$$

wherein x, y and z are each a mole ratio, and $1 \leq x \leq 10$, $0 \leq y \leq 5$, and $2 \leq z \leq 15$.

5. The supported catalyst with a solid sphere structure as claimed in claim 1, wherein the supported catalyst has a spherical shape of about 20 to about 100 μm average diameter or an oval shape of about 0 to about 0.2 flattening rate.

6. The supported catalyst with a solid sphere structure as claimed in claim 1, wherein the supported catalyst has a bulk density of about 0.3 to about 0.6 g/ml.

7. The supported catalyst with a solid sphere structure as claimed in claim 1, wherein the metal comprises a plurality of metal particles distributed on the surface and the inside of the oxide supporting body.

8. A supporting body precursor with a solid sphere structure, comprising an ammonium salt and having a mole ratio as follows:

$$(Co,Ni,Fe):(V,Mo):(Mg,Si,Al)=x:y:z$$

wherein $1 \leq x \leq 10$, $0 \leq y \leq 5$, and $2 \leq z \leq 30$.

9. A carbon nanotube, which is prepared using the supported catalyst of claim 1.

10. The carbon nanotube of claim 9, which is prepared in a fluidized bed reactor.

11. The carbon nanotube of claim 9, which is prepared by injecting hydrocarbon gas at about 600 to about 1100° C. in the presence of the supported catalyst.

12. A method of making a carbon nanotube, comprising injecting hydrocarbon gas at about 600 to about 1100° C. in the presence of a supported catalyst of claim 1.

* * * * *